United States Patent
Müller

(10) Patent No.: US 6,899,742 B2
(45) Date of Patent: May 31, 2005

(54) CLEANING ARRANGEMENT FOR A SUSPENDED PARTICLE FILTER

(76) Inventor: Andreas Müller, Blumenstrasse, 12.68723 Oftersheim (DE)

(*) Notice: Subject to any disclaimer, the term of this patent is extended or adjusted under 35 U.S.C. 154(b) by 0 days.

(21) Appl. No.: 10/444,931

(22) Filed: May 23, 2003

(65) Prior Publication Data

US 2003/0217533 A1 Nov. 27, 2003

(30) Foreign Application Priority Data

May 25, 2002 (DE) .......................... 102 23 335

(51) Int. Cl.[7] .............................................. B01D 29/68
(52) U.S. Cl. .............................. 55/302; 55/284; 55/291; 95/278; 95/280; 210/411; 210/412; 210/433.1; 210/33.01
(58) Field of Search .................. 55/302, 284, 291; 95/278, 280; 210/411, 412, 433.1, 333.01; 96/425, 427–429

(56) References Cited

U.S. PATENT DOCUMENTS 2,782,612 A * 2/1957 Spiegelhalter ............... 62/162
2,976,953 A 3/1961 Haas et al.
4,521,230 A * 6/1985 Strong .......................... 96/418
6,558,443 B2 * 5/2003 Leibold ....................... 55/302

FOREIGN PATENT DOCUMENTS

DE 1 146 339 3/1963

* cited by examiner

*Primary Examiner*—Minh-Chau T. Pham
(74) *Attorney, Agent, or Firm*—Klaus J. Bach

(57) ABSTRACT

In a cleaning arrangement for a filter element disposed in a gas flow channel and including a plurality of filter pockets, a flow blocking element arranged adjacent the filter element at the downstream side thereof and having openings movable with the flow blocking element into alignment with the various filter pockets for controlling a back-flushing gas flow through the filter element, the blocking element is an elastic thin-walled structure provided with at least one opening of a shape corresponding in cross-section to the filter pocket openings and means are provided for generating in the area downstream of the blocking element a gas pressure for back-flushing the filter element pockets in succession as the blocking element with the at least one opening is moved across the filter element.

9 Claims, 3 Drawing Sheets

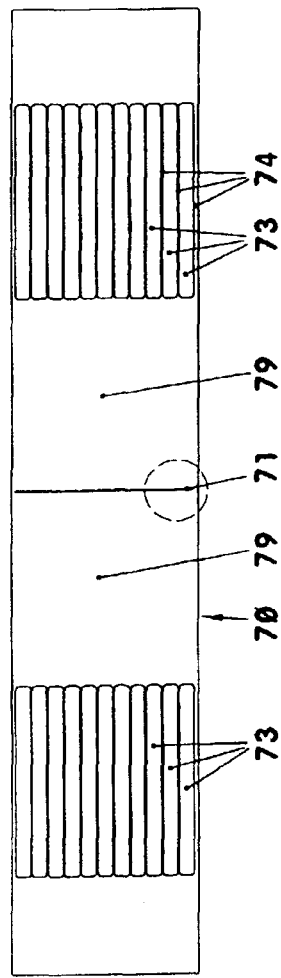
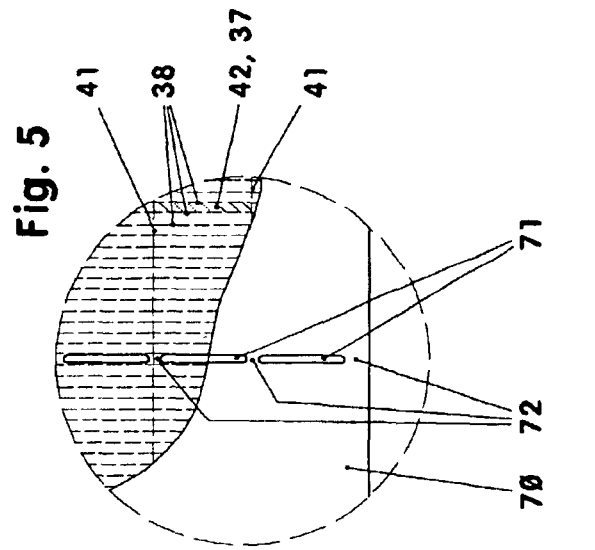
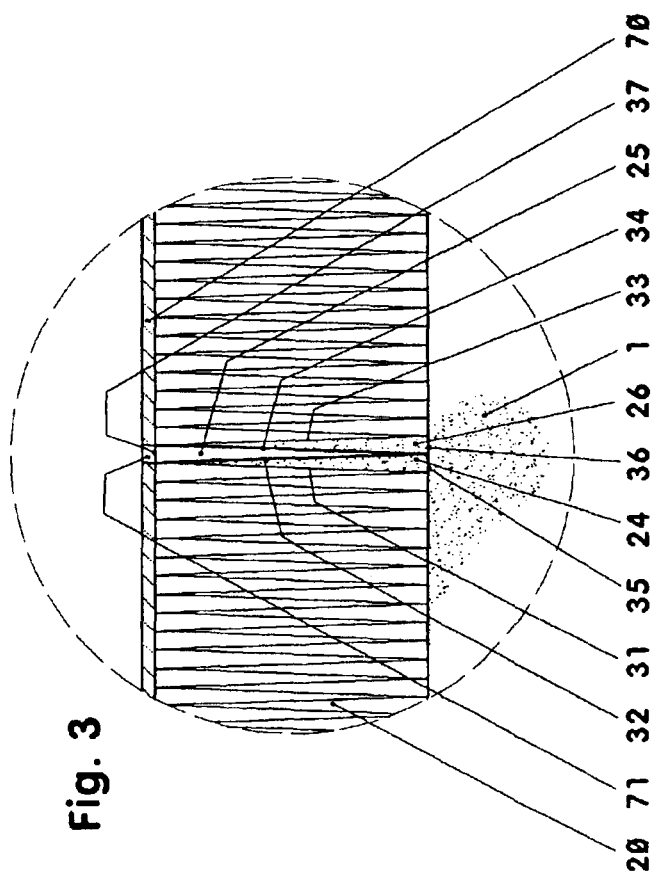

CLEANING ARRANGEMENT FOR A SUSPENDED PARTICLE FILTER

BACKGROUND OF THE INVENTION

The invention relates to a cleaning arrangement for a suspended particle filter element including a plurality of filter pockets wherein during cleaning at least one of the filter pockets is subjected from the clean side of the filter to a low pressure back-flushing gas by way of gas flow control element which is movable across the filter element at the clean side thereof.

DE 196 01 978 C2 discloses a filter element with filter pockets to which, during cleaning, pressurized gas is selectively admitted from the clean filter side for removing and back-flushing the particles retained by the filter. To this end, the cleaning arrangement includes a slot-like nozzle, which is movable along the filter element. The nozzle represents the back-flushing gas allocation element. On the filter element, a wear-resistant slotted mask of stainless steel is disposed. To avoid air leakage between the slot-like nozzle and the slotted mask, the slot-like nozzle is pressed into light engagement with the slotted mask.

It is the object of the present invention to provide a filter cleaning arrangement, which provides for an effective, energy-saving and gentle low-pressure cleaning action using commercially available filter elements. The filter cleaning arrangement should further be simple and comprise components which can easily be installed and serviced and which operate reliably and have a long service life.

SUMMARY OF THE INVENTION

In a cleaning arrangement for a filter element disposed in a gas flow channel and including a plurality of filter pockets, a flow blocking element arranged adjacent the filter element at the downstream side thereof and having openings movable with the flow blocking element into alignment with the various filter pockets for controlling a back-flushing gas flow through the filter element, the blocking element is an elastic thin-walled structure provided with at least one opening of a shape corresponding in cross-section to the filter pocket openings and means are provided for generating in the area downstream of the blocking element a gas pressure for back-flushing the filter element pockets in succession as the blocking element with the at least one opening is moved across the filter element.

The cleaning arrangement includes an elastic blocking element, which is flexibly supported at the discharge end that is the clean side of the filter element. The discharge end area of the filter element does not need to be planar nor rectangular. If, for example, a cartridge filter is employed which is exposed on its outside to the gas to be cleaned, the blocking element may be disposed in the central opening of the cartridge filter, which has a hollow cylindrical shape. If a round filter element is used with a discharge opening at one of its planar end faces, the blocking element is in the form of a round flexible disc. If the discharge area is cone-shaped, the blocking element may be for example in the form of a cone-shaped shell. Also a spherical form is conceivable for the filter element discharge area and the blocking element. The disc or cone-shaped blocking elements are rotated about their axes of symmetry for cleaning.

The contours of the discharge openings of the filter pockets are generally limited to rectangular shapes. However the discharge opening may have any contour, for example round, oval, elliptical, circle sectional, triangular or prismatic shapes, the opening of the blocking elements through which the back-flushing gas is admitted to the filter is adapted to a particular filter discharge opening. Also, the discharge openings are not necessarily disposed in a plane.

The rotatable disc-like blocking element is endless. However, a blocking element for a rectangular area may also be endless, if it is in the form of an endless band extending around spaced spools. For normal filtering operation, a cleaning arrangement may be provided which can be completely removed from the clean gas area of the filter apparatus. Preferably however the blocking element, or, respectively, endless band includes openings which may be arranged opposite each other so that they are in alignment and provide an essentially unrestricted flow path for the clean gas leaving the filter.

In many cases, the gas to be cleaned is air polluted by dust and aerosols.

The invention will be described in greater detail below on the basis of the accompanying drawings.

BRIEF DESCRIPTION OF THE DRAWINGS

FIG. 3 is an enlarged view of a section of the filter during back-flushing in accordance with FIG. 2, FIG. 4 shows a blocking element developed, and FIG. 5 is an enlarged view showing the slot-like openings in the blocking element.

DESCRIPTION OF A PREFERRED EMBODIMENT

Figure 1:
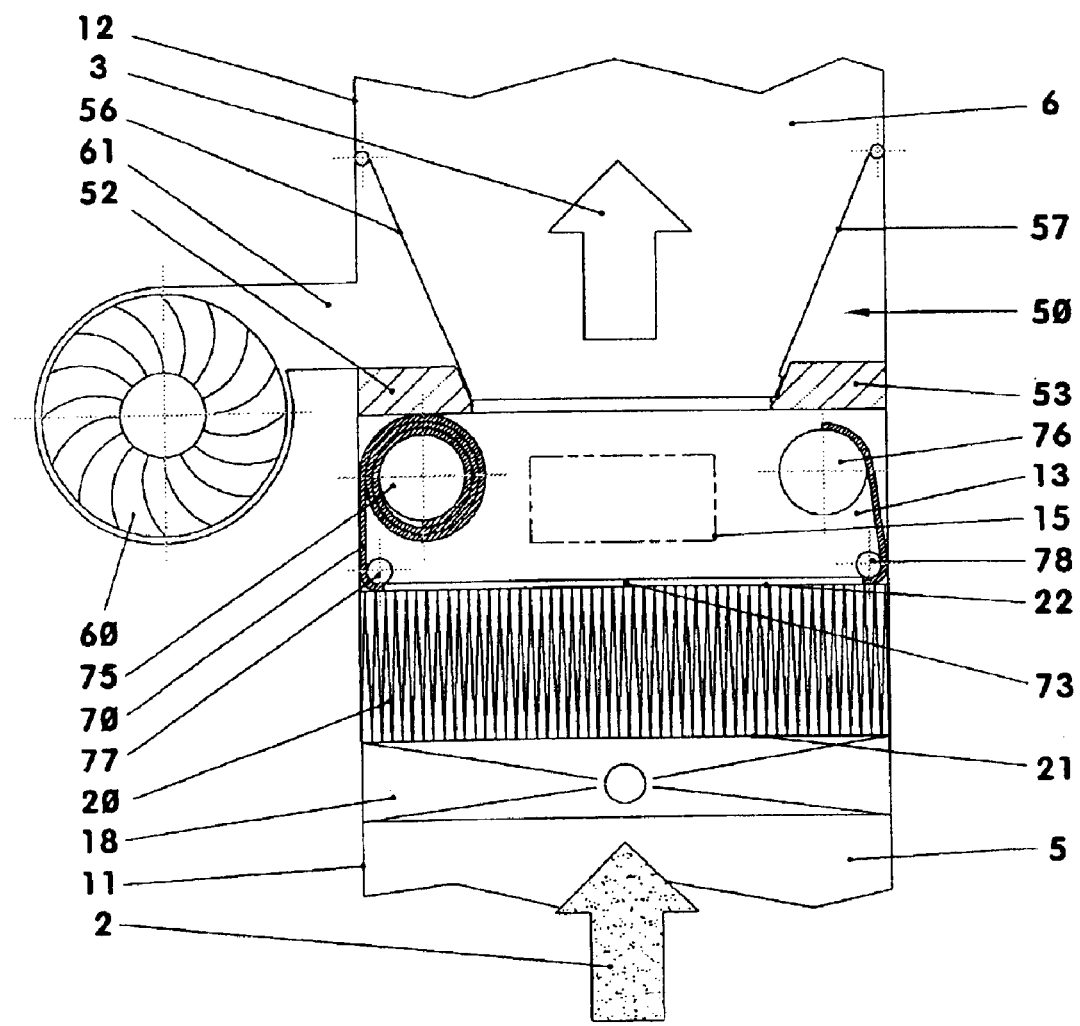
FIG. 1 shows schematically a gas filtering apparatus during filtering operation.

FIG. 1 shows an exhaust gas stack or channel 11, 12 including, as an example, a box filter 20 with an upstream dust collector 18 and a downstream cleaning arrangement 50. Under normal filter operation, the dust and/or aerosol-containing gas 2 enters the filter 20 by way of the entrance cross-section 21 and leaves the filter 20 as an essentially purified gas 3 by way of the clean gas side discharge flow cross-section 22.

In the box filter 20, which is shown to be in block form, a glass fiber sheet is used as filter medium which is contained in a rectangular support frame folded in zigzag form. Each fold of the pleated filter element 20 forms between two adjacent filter walls 31, 32, 33, 34, a front filter pocket 24, 26, each with an inlet opening 35, 36, see FIG. 3. Between two front filter pockets 24, 26, which are open toward the raw gas side, there is a rear filter pocket 25, which is open toward the clean gas side. The two filter walls 32, 33 of this filter pocket 25 are at the same time part of the front filter pockets 24, 26.

The box filters 20 include so-called reinforcement webs 41, which extend transversely to the filter walls 31–34 for stabilizing the filter pockets and which divide the filter pockets 24–26 into several hermetically separated and generally equidistant areas 42. In the given example, twelve equally sized areas 42 are present. One of these areas 42 is shown in FIG. 5 by hatching.

Instead of the box filter 20, a cartridge filter may also be used.

The adjacent filter walls 31–34 may be arranged in a filter pack, instead of in a zig-zag arrangement, also in parallel or at least approximately parallel arrangement so that the filter pockets 24–26 have square cross-section rather than a prismatic cross-section.

A large part of the cleaning arrangement is disposed downstream of the box filter 20. This part comprises the back-flushing gas chamber 51, which can be pressurized by means of a back-flushing gas blower 60 to a pressure of, for example, 6000 to 10000 Pa. The back-flushing gas chamber 51 can be separated for that purpose from the discharge gas channel 12 by a gate structure 55, see FIG. 2. The gate structure 55 consists for example of two motor operated pivot flaps 56, 57. During normal filter operation, the pivot flaps 56, 57 abut the side walls of the discharge channel 12 or webs 52, 53 so as to form a discharge cone.

As the back-flushing blower 60 for example a side channel compressor may be used which is in communication with the back-flushing gas chamber 51 by way of a back-flushing gas channel 61. Under certain conditions, the blower 60 may also be arranged within the back-flushing gas chamber 51 and the intake air may then be supplied to the blower by way of an opening in the chamber wall.

Immediately downstream of the box filter 20, there is the gas approportioning or respectively, blocking element 70. It is disposed directly on the box filter 20 so that it covers the box filter discharge opening almost fully, at least at the beginning and the end of the back-flushing procedure. The blocking element 70 is in the embodiment shown in the figures an area foil consisting of an elastic material. The foil material is for example a plastic, a rubber-like material or a metal. If a plastic material is used, it is expediently fiber reinforced. If a rubber-like material is used, it may be surface treated by halogenization in order to reduce its friction.

The blocking element 70 may be wound onto spools. In an unwound state, it has a rectangular shape as shown in FIG. 4 in a top view. In its center, it has a straight row of slot-like openings 71 extending transverse to the longitudinal extension 9 of the blocking element 70. The individual openings 71 are elongated and are rounded at their ends in a semi-circular fashion. In this way, the chance of ripping by high notch tensions is prevented.

Between the elongated openings 71, there are short narrow webs 72 having a width corresponding about to the width of the openings 71. These webs 72 are disposed over the reinforcement webs 41 of the box filter 20, see FIG. 5. The reinforcement webs 41 are covered by the blocking element 70 and are therefore indicated by dashed lines.

At opposite sides of the openings 71, the blocking element 70 includes long, essentially rectangular cutouts 73. The length of the cutouts corresponds approximately to the width of the exhaust stack or channel 11, 12 shown in FIGS. 1 and 2.

In FIG. 1, the blocking element 70, shown for reasons of representation with a disproportionately large foil thickness, is in a position in which the channel or stack 11, 12 is completely open so that the gas flow through the filter is uninhibited.

The cutouts 73 are punched or cut into the blocking element. Consequently, the long webs 74 at opposite sides of the cut-outs 73 consist of the same material as the blocking element 70. Also, these webs are so arranged that they abut the reinforcement webs 41 of the box filter 20 so that they do not provide an essential flow resistance during normal filter operation. Depending on the blocking element material, the number of long webs 72, 74 may be limited but at least two should be provided. These higher loaded webs 72 and/or 74 may then consist of a material different from that of which the blocking element consists. It is also possible to replace the areas of the cutouts 73 and the long webs 74 by net or lattice structures.

The distance or, respectively, the width 79 between the cutouts 73 and the elongated openings 71 is—in the longitudinal direction of the blocking element—somewhat greater than the width of the gas channel 11, 12.

The blocking element 70 is stored on two spools 75, 76 and held in position in front of the discharge cross-section 22 by two guide rollers 77, 78. The spools 75, 76 have, for example, end flanges for guiding the blocking element 70. These flanges may be replaced by other guide structures such as guide webs arranged at the sides of the spools. The spools 75, 76 may also be replaced by pin rollers whose radial pins are received in corresponding openings of the blocking element 70.

The guide rollers 77, 78 are arranged in the given example in the area of side walls of the gas channel 11, 12. Their diameter is smaller than that of the spools 75, 76. The axes of rotation of the guide rollers and of the spools are parallel to each other.

Both spools 75, 76 may be provided with separate electrical drives. The spools 75, 76 include for example tube motors provided with reducing gears in the spools for moving the blocking element. The so-called tube motors are standard drives as they are used for example in the hollow support shafts of jalousies.

The motor, which winds the blocking element 70 onto its spool, has a pull function whereas the other motor has a braking function. In this way, the blocking element 70 remains under tension over its whole range of movement.

Alternatively, both spools 75, 76 may be driven by an enveloping drive. In order to accommodate the then different angular speeds of the spools 75, 76 at least one of the spools 75, 76 is coupled to the enveloping drive by way of a rotating elastic, for example, a pre-tensioned coupling.

It is furthermore possible, for example by an appropriate dimensioning of the blocking element 70 and the gas channel 11, 12 to eliminate the guide rollers 77, 78.

The spools 75, 76 together with their drives and, if present, the guide rollers 77, 78 and an installed blocking element 70 can be integrated in a separate installation frame that can be inserted into the gas channel 11, 12.

The spools 75, 76 and the guide rollers 77, 78 are supported near a wall 13 of the gas channel 11, 12, see FIG. 1. In this wall 13, for example, between the spools 75, 76, an alternative back-flushing gas channel 15 may be connected to the gas channel 11, 12. The alternative back-flushing gas channel 15 may also be provided with a blower. If, in this case, the pivot flaps 56, 57 of the gate 55 are pivotally supported near the spools 75, 76, that is, on the separate installation frame, a separate space-saving modular unit is formed which can easily be inserted into the gas flow channel 11, 12.

Figure 2:
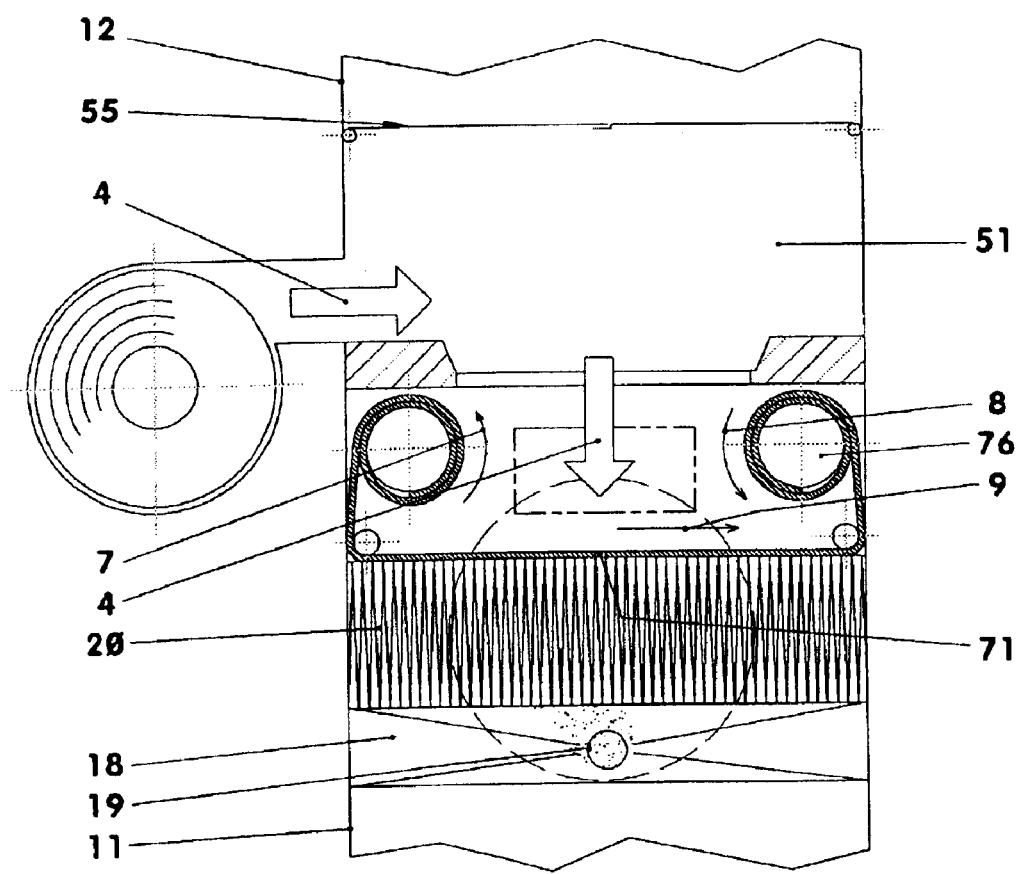
FIG. 2 shows the gas filtering apparatus during back-flushing.

As shown in FIGS. 1 and 2, as another part of the gas cleaning arrangement 50, the funnel-like dust collector 18 including, if present, a dust discharge opening 19 that can be closed, is disposed upstream of the box filter 20. The dust discharge opening 19 is in communication with a dust collection container, which is not shown in the drawings.

During normal filtering operation of the exhaust gas cleaning arrangement as shown in FIG. 1, the dust-containing raw gas 2 flows from the gas channel 11 through the box filter 20, where it is filtered, to the gas discharge channel 12 to be discharged as purified gas 3. The blocking element 70 is arranged with its large area cutouts 73 disposed adjacent the discharge area of the box filter 20 so that the purified gas can pass without restriction. The pivot flaps 56, 57 are in their open positions.

When the filter is to be cleaned by back-flushing, the raw gas flow is shut down—see FIG. 2. The dust discharge opening 19 is opened and the right side spool 76 is rotated in the direction as indicated by the arrow 8 in order to wind up the part of the blocking element with the large area openings 73. The pivot flaps 56, 57 are moved to their closed positions whereby a closed back-flushing space 51 is formed. When the elongated slot-like openings 71 of the blocking element 70 reach the area of the discharge cross-section 22, the compressor or blower 60 is operated. The blower 60 generates in the back-flushing space 51 a pressure by which the blocking element 70 which is now closed with the exception of the slot-like openings 71, is biased in the area of the discharge cross-section 22 elastically into engagement with the reinforcement webs 41 and the edges 38 of the box filter 20, see FIG. 5. The reinforcement webs 41 and the edges 38 do not require any particular coating or treatment for sealingly supporting the blocking element 70.

If now an opening 71 is disposed directly over the discharge opening 37 of a filter pocket 25, see FIG. 3, the back-flushing gas 4 flows into the respective pocket 25 and back-flushes the dust collected on the raw gas side of the filter walls 32, 33 without subjecting the filter fleece to a large load. The dust particles removed from the filter walls 32, 33 are carried out through the adjacent filter pockets 24, 26 and deposited in the dust collection container by way of the dust collector 18.

However, it is not necessary that, during the back-flushing procedure, the slot-like opening 71 of the blocking element 70 rests over a discharge opening 37 of a filter pocket 25 for a certain period—by stopping the movement of the blocking element 70. The blocking element 70 may move continuously during the back-flushing procedure in its respective direction of movement 9. However, a short stop over each discharge opening 37 can easily be established by a corresponding control.

As soon as the row of openings 71 has moved past the right guide roller 78, the cutouts 73 move past the left guide roller and into the area of the discharge cross-section 22. The blower 60 is then de-energized, the dust discharge opening 19 is closed and the pivot flaps 56, 57 are opened. Rotation of the pulling right side spool 76 is only terminated when the cutouts 73 are centered on the discharge cross-section area 22. Then the raw gas flow 2 is re-established for a normal filtering operation.

During the next cleaning procedure the blocking element 70 is wound onto the left spool 75. As shown in FIG. 4, the blocking element 70 includes two areas with large cutouts 73 to permit back-flushing with the blocking element moving in either direction. However, one of the large cutout areas can be eliminated if, after a back-flushing procedure, the blocking element is re-wound before the next filtering period begins.

It is also possible to provide an arrangement in which the whole back-flushing unit including the spools 75, 76 and the blocking element, is removably supported in the channel 12 the back-flushing unit may be supported for example on a carriage by which it can be moved transversely out of the gas flow channel 12 or it may be supported pivotally so that it can be pivoted by 90° out of the flow channel 12 into a position parallel to the flow channel 12.

If, for example a cylindrical cartridge filter is used, the blocking element may be for example an elastic slotted, thin-walled blocking tube, which is inserted into the central cartridge opening only for back-flushing. This blocking tube then includes the opening and passages extending longitudinally and transversely needed for the back-flushing depending on the design of the cartridge filter. The back-flushing is controlled by rotational and/or longitudinal movement of the blocking tube in the filter cartridges. After termination of the cleaning procedure the blocking tube is again pulled out of the cartridge filter.

With a parallel arrangement of two or several cleaning arrangements 50 in combination with filter elements 20 and flow channels 11, 12, a continuous filtering operation is possible. The filter 20 not used for filtering raw gas 2 can then be cleaned while the gas is diverted through one or more of the other filter elements.

What is claimed is:

1. A cleaning arrangement for a filter element for removing particles suspended in a raw gas flow, said filter elements being disposed in a gas flow channel and including filter pockets, a blocking element arranged adjacent said filter elements for controlling a back-flushing gas flow through the pockets of the filter element, said blocking element comprising an elastic, thin-walled structure movably disposed on the downstream side of the filter element so as to extend across said gas flow channel directly above said filter element and having at least one opening of a shape corresponding in cross-section approximately to the openings of the filter element pockets, means including pivot flaps arranged downstream of the blocking element in spaced relationship therefrom for closing the gas flow channel, and a back-flushing air supply connected to the area of the gas flow channel between the blocking element and the pivot flaps for generating, with the pivot flaps closed, in the area downstream of the blocking element a gas pressure providing for back-flushing of the filter element pockets in succession as the blocking element with the at least one opening is moved across the filter element.

2. A cleaning arrangement according to claim 1, wherein the blocking element is a foil, which extends between two spools arranged in the flow channel at opposite sides of the filter element, said foil being movable across the filter element by rotation of the spools.

3. A cleaning arrangement according to claim 2, wherein the blocking element includes, at opposite sides of the at least one opening, blocking areas of a width corresponding at least to the width of the filter element in the direction of movement of the blocking element.

4. A cleaning arrangement according to claim 3, wherein, outside the blocking areas, the blocking element includes areas with cutouts having a width corresponding to the width of the blocking areas.

5. A cleaning arrangement according to claim 2, wherein two guide rollers are arranged at opposite sides of the gas flow channel for guiding the foil over the outlet area of the filter element.

6. A cleaning arrangement according to claim 2, wherein the two spools include drives for rotating the spools to wind the foil onto one, and unwind it from the other, spool.

7. A cleaning arrangement according to claim 6, wherein the drives are tube motors.

8. A cleaning arrangement according to claim 1, wherein said back-flushing gas supply is a blower arranged in communication with an area of the gas flow channel just downstream of the filter element.

9. A cleaning arrangement according to claim 8, wherein a back-flushing chamber is provided in the area of the gas flow channel just downstream of the filter element and the gas blower is in communication with the back-flushing chamber, and a gate structure is provided at the downstream end of the back-flushing chamber for closing the back-flushing chamber for establishing a back-flushing gas pressure in the back-flushing chamber.

* * * * *